(12) United States Patent
Miao et al.

(10) Patent No.: US 10,338,998 B2
(45) Date of Patent: Jul. 2, 2019

(54) METHODS FOR PRIORITY WRITES IN AN SSD (SOLID STATE DISK) SYSTEM AND APPARATUSES USING THE SAME

(71) Applicant: Shannon Systems Ltd., Shanghai (CN)

(72) Inventors: Ningzhong Miao, Shanghai (CN); Zhen Zhou, Shanghai (CN)

(73) Assignee: SHANNON SYSTEMS LTD., Shanghai (CN)

(*) Notice: Subject to any disclaimer, the term of this patent is extended or adjusted under 35 U.S.C. 154(b) by 158 days.

(21) Appl. No.: 15/626,334

(22) Filed: Jun. 19, 2017

(65) Prior Publication Data

US 2018/0067797 A1 Mar. 8, 2018

(30) Foreign Application Priority Data

Sep. 5, 2016 (CN) .......................... 2016 1 0802224

(51) Int. Cl.
*G06F 11/00* (2006.01)
*G06F 11/10* (2006.01)
*G06F 3/06* (2006.01)

(52) U.S. Cl.
CPC .......... *G06F 11/1044* (2013.01); *G06F 3/061* (2013.01); *G06F 3/065* (2013.01); *G06F 3/0619* (2013.01); *G06F 3/0659* (2013.01); *G06F 3/0665* (2013.01); *G06F 3/0679* (2013.01); *G06F 3/0689* (2013.01); *G06F 11/108* (2013.01)

(58) Field of Classification Search
CPC .................................................. G06F 11/1044

USPC .............. 714/6.24, 6.2, 6.21, 6.22, 6.23, 6.1
See application file for complete search history.

(56) References Cited

U.S. PATENT DOCUMENTS

| | | | |
|---|---|---|---|
| 8,266,367 B2* | 9/2012 | Yu .......................... | G06F 3/0608 711/103 |
| 2011/0320709 A1* | 12/2011 | Han ......................... | G06F 3/061 711/114 |
| 2013/0019057 A1* | 1/2013 | Stephens ................ | G06F 11/108 711/103 |
| 2013/0145085 A1* | 6/2013 | Yu ......................... | G06F 12/0246 711/103 |
| 2015/0058700 A1* | 2/2015 | Yang ...................... | G06F 11/108 714/773 |

* cited by examiner

*Primary Examiner* — Dieu Minh T Le
(74) *Attorney, Agent, or Firm* — McClure, Qualey & Rodack, LLP

(57) ABSTRACT

The invention introduces a method for priority writes in an SSD (Solid State Disk) system, performed by a processing unit, including at least the following steps. After a priority write command instructing the processing unit to write first data whose length is less than a page length in a storage unit is received, a buffer controller is directed to store the first data from the next available sub-region of a buffer, which is associated with a priority write, in a first direction. After a non-priority write command instructing to write second data whose length is less than page length in the storage unit is received, the buffer controller is directed to store the second data from the next available sub-region of the buffer, which is associated with a non-priority write, in a second direction.

20 Claims, 7 Drawing Sheets

METHODS FOR PRIORITY WRITES IN AN SSD (SOLID STATE DISK) SYSTEM AND APPARATUSES USING THE SAME

CROSS REFERENCE TO RELATED APPLICATIONS

This Application claims priority of China Patent Application No. 201610802224.3, filed on Sep. 5, 2016, the entirety of which is incorporated by reference herein.

BACKGROUND

Technical Field

The present invention relates to flash memory, and in particular to methods for priority writes in an SSD (Solid State Disk) system and apparatuses using the same.

Description of the Related Art

Flash memory devices typically include NOR flash devices and NAND flash devices. NOR flash devices are random access—a host accessing a NOR flash device can provide the device with any address on its address pins and immediately retrieve data stored in that address on the device's data pins. NAND flash devices, on the other hand, are not random access but serial access. It is not possible for NOR to access any random address in the way described above. Instead, the host has to write into the device a sequence of bytes which identifies both the type of command requested (e.g. read, write, erase, etc.) and the address to be used for that command. The address identifies a page (the smallest unit of flash memory that can be written in a single operation) or a block (the smallest unit of flash memory that can be erased in a single operation), and not a single byte or word. In reality, the NAND flash device always reads complete pages from the memory cells and writes complete pages to the memory cells. After a page of data is read from the array into a buffer inside the device, the host can access the data bytes or words one by one by serially clocking them out using a strobe signal.

Priority write is an important feature of the storage system for applications such as databases. The storage system may have heavy load at times. To improve efficiency, the conventional storage system has very deep queue and exploits the parallelism from all outstanding requests to improve performance. Throughput is gained by suffering latency, that is, one request may be stuck in the queue for a long period of time due to unfavorable request scheduling. In typical database transactions, updates are committed in two phases: The modifications are logged in the redo log and the redo log is flushed; and actual data updates according to the redo log are performed in the background. However, the update of the redo log may hinder other updates, most likely data page updates from previously committed transactions. Accordingly, what is needed are methods for priority writes in an SSD (Solid State Disk) system and apparatuses using the same to address the aforementioned problem.

BRIEF SUMMARY

An embodiment of the invention introduces a method for priority writes in an SSD (Solid State Disk) system, performed by a processing unit, including at least the following steps: After a priority write command instructing to write first data whose length is less than a page length in a storage unit is received, a buffer controller is directed to store the first data from the next available sub-region of a buffer, which is associated with a priority write, in a first direction. After a non-priority write command instructing to write second data whose length is less than page length in the storage unit is received, the buffer controller is directed to store the second data from the next available sub-region of the buffer, which is associated with a non-priority write, in a second direction.

An embodiment of the invention introduces an apparatus for priority writes in an SSD system, including at least a buffer controller and a processing unit: The processing unit, coupled to the buffer controller, receives a priority write command instructing to write first data whose length is less than a page length in a storage unit from a host device; directs the buffer controller to store the first data from the next available sub-region of a buffer, which is associated with a priority write, in a first direction; receives a non-priority write command instructing to write second data whose length is less than page length in the storage unit from the host device; and directs the buffer controller to store the second data from the next available sub-region of the buffer, which is associated with a non-priority write, in a second direction.

A detailed description is given in the following embodiments with reference made to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
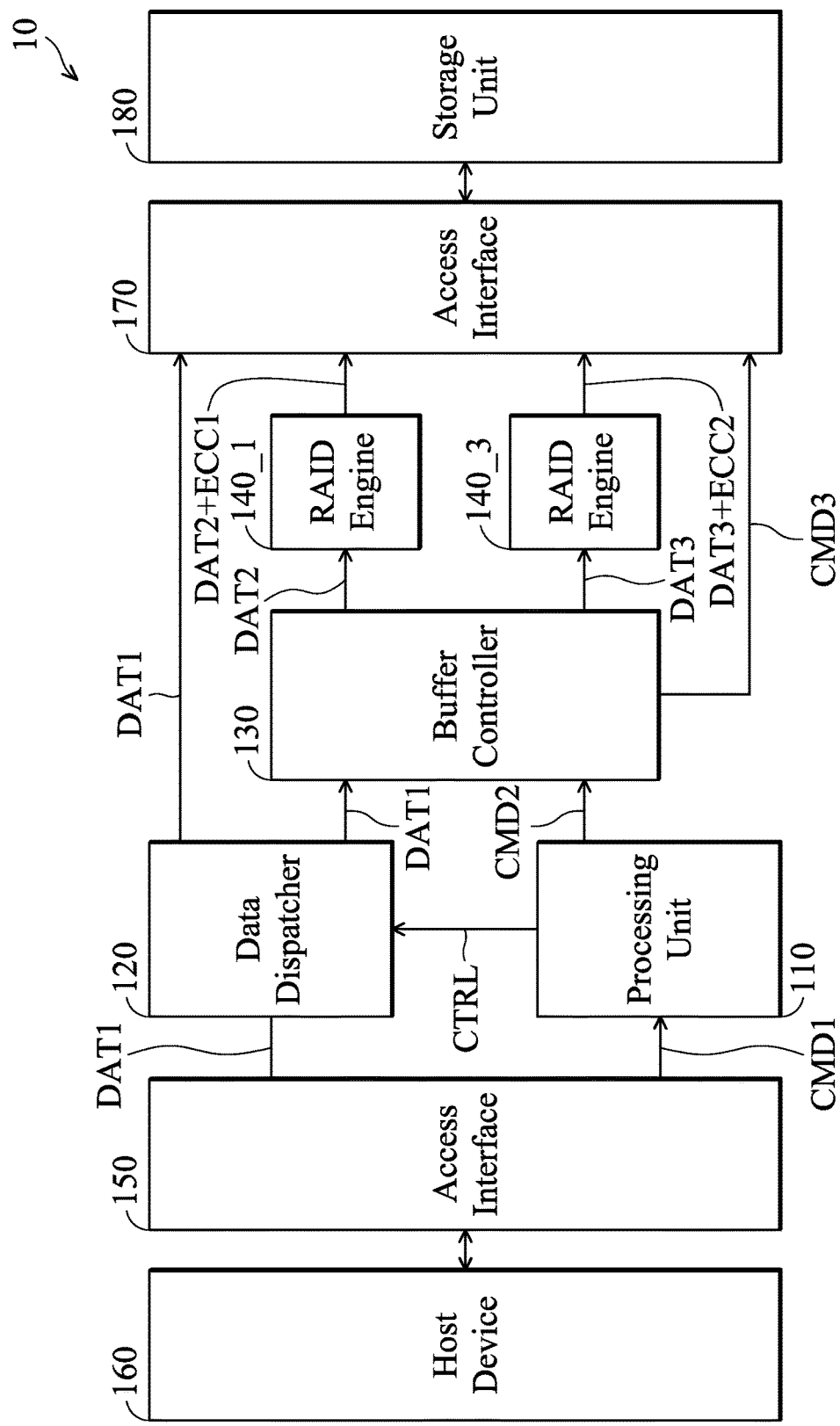
FIG. 1 is the system architecture of a flash memory according to an embodiment of the invention.

FIG. 1 is the system architecture of a flash memory according to an embodiment of the invention. The system architecture 10 of the flash memory contains a processing unit 110 being configured to write data into a designated address of a storage unit 180, and read data from a designated address thereof. Specifically, the processing unit 110 writes data into a designated address of the storage unit 180 through an access interface 170 and reads data from a designated address thereof through the same interface 170. The processing unit 110 can be implemented in numerous ways, such as with dedicated hardware, or with general-purpose hardware (e.g., a single processor, multiple processors or graphics processing units capable of parallel computations, etc.) that is programmed using microcode or software instructions to perform the functions recited herein. The processing unit 110 may contain one or more ALUs (Arithmetic and Logic Units) and bit shifters. The Arithmetic and Logic Unit is responsible for performing boolean operations (such as, AND, OR, NOT, NAND, NOR, XOR, XNOR, etc.) and also for performing integer addition and subtraction. The bit shifter is responsible for shift and rotations. The system architecture 10 uses several electrical signals for coordinating commands and data transfer between the processing unit 110 and the storage unit 180, including data lines, a clock signal and control lines. The data lines are employed to transfer commands, addresses and data to be written and read. The control lines are utilized to issue control signals, such as CE (Chip Enable), ALE (Address Latch Enable), CLE (Command Latch Enable), WE (Write Enable), etc. The access interface 170 may communicate with the storage unit 180 using a SDR (Single Data Rate) protocol or a DDR (Double Data Rate) protocol, such as ONFI (open NAND flash interface), DDR toggle, or others. The processing unit 110 may communicate with the host device 160 through an access interface 150 using a standard protocol, such as USB (Universal Serial Bus), ATA (Advanced Technology Attachment), SATA (Serial ATA), PCI-E (Peripheral Component Interconnect Express) or others.

Figure 2:
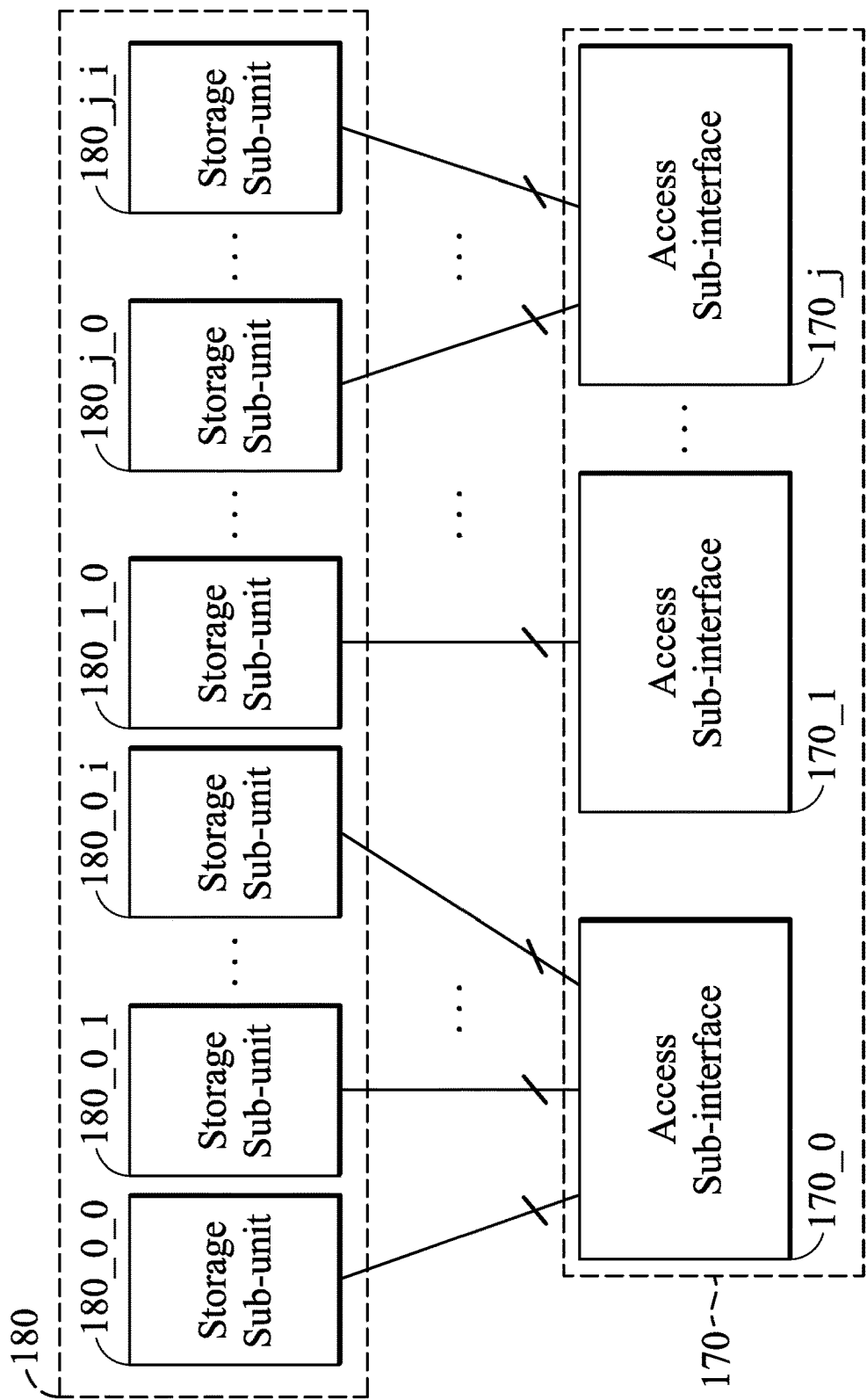
FIG. 2 is a schematic diagram illustrating interfaces to storage units of a flash storage according to an embodiment of the invention.
Figure 3:
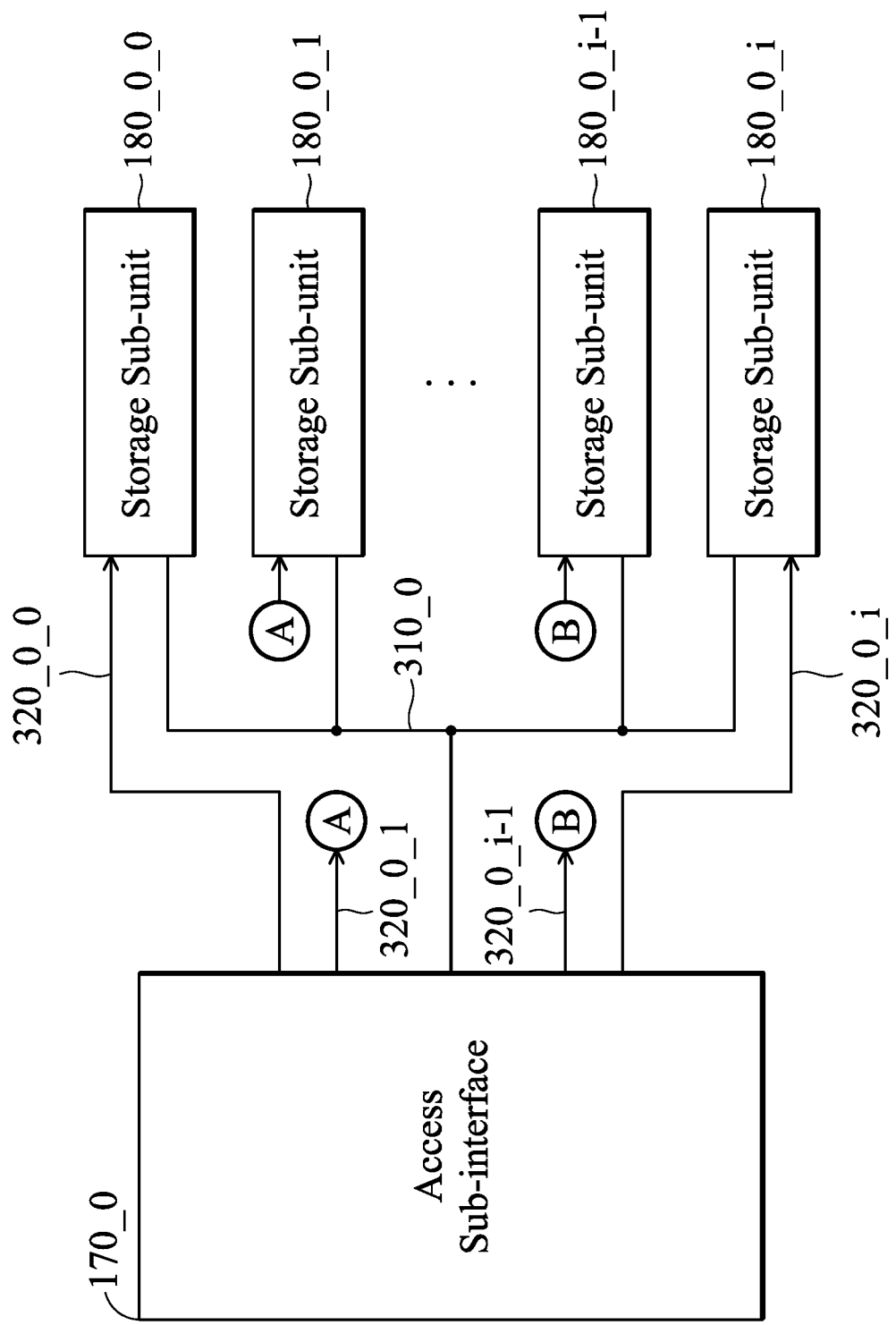
FIG. 3 is a schematic diagram depicting connections between one access sub-interface and multiple storage sub-units according to an embodiment of the invention.

The storage unit 180 may contain multiple storage sub-units and each storage sub-unit may be practiced in a single die and use a respective access sub-interface to communicate with the processing unit 110. FIG. 2 is a schematic diagram illustrating interfaces to storage units of a flash storage according to an embodiment of the invention. The flash memory 10 may contain j+1 access sub-interfaces 170_0 to 170_j, where the access sub-interfaces may be referred to as channels, and each access sub-interface connects to i+1 storage sub-units. That is, i+1 storage sub-units may share the same access sub-interface. For example, assume that the flash memory contains 4 channels (j=3) and each channel connects to 4 storage sub-units (i=3): The flash memory 10 has 16 storage sub-units 180_0_0 to 180_j_i in total. The processing unit 110 may direct one of the access sub-interfaces 170_0 to 170_j to read data from the designated storage sub-unit. Each storage sub-unit has an independent CE control signal. That is, it is required to enable a corresponding CE control signal when attempting to perform a data read from a designated storage sub-unit via an associated access sub-interface. It is apparent that any number of channels may be provided in the flash memory 10, and each channel may be associated with any number of storage sub-units, and the invention should not be limited thereto. FIG. 3 is a schematic diagram depicting connections between one access sub-interface and multiple storage sub-units according to an embodiment of the invention. The processing unit 110, through the access sub-interface 170_0, may use independent CE control signals 320_0_0 to 320_0_i to select one of the connected storage sub-units 180_0_0 and 180_0_i, and then program data into the designated location of the selected storage sub-unit via the shared data line 310_0.

Figure 4:
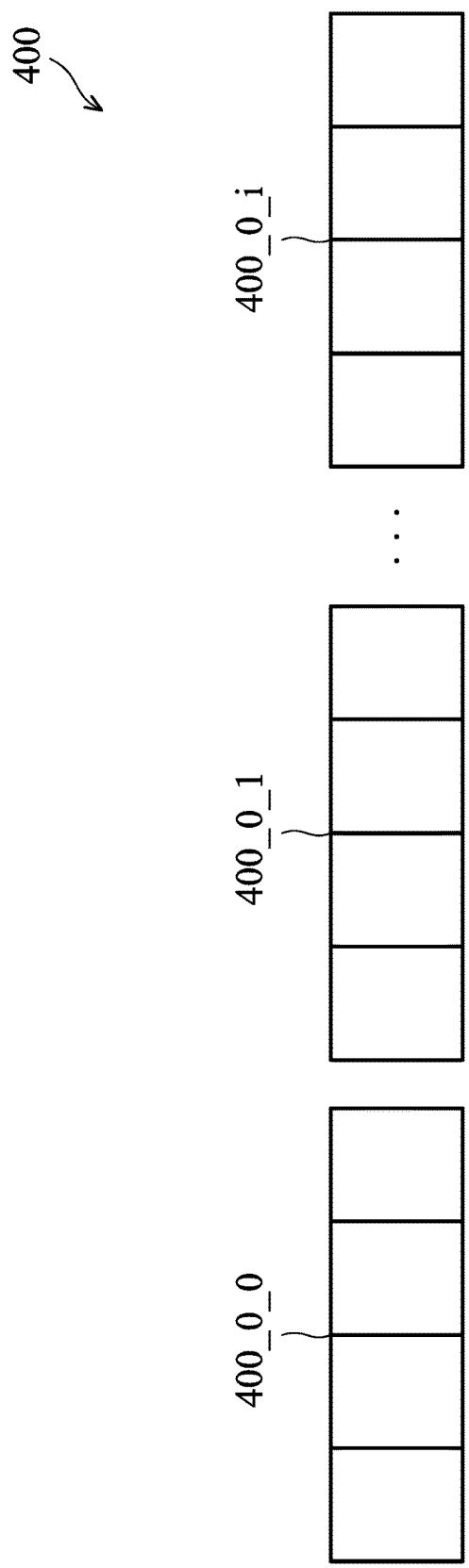
FIG. 4 is a schematic diagram illustrating a buffer according to an embodiment of the invention.

The processing unit 110 may use one of two modes to direct the access interface 170 to program data: One is direct write; and the other is buffered write. When a write command CMD1 issued by the host device 160 instructs to write data whose length exceeds one page length, the processing unit 110 enters the direct write mode. Assume that the length of one page is 16K bytes: When determining that a write command CMD1 issued by the host device 160 instructs to write data whose length exceeds 16K bytes, the processing unit 110 uses the direct write mode to program data. It should be noted that, if a data length to be programed is less than a multiple of one page length (such as nxp data, where n represents the number of pages and p represents the data length of one page), the spare space is filled with dummy data. Specifically, in the direct write mode, the processing unit 110 issues a control signal CTRL to direct a data dispatcher 120 to send data DAT1 to the access interface 170 and issues a command CMD3 to direct the access interface 170 to program the data DAT1 into a designated address of the storage unit 180. When determining that a write command CMD1 issued by the host device 160 instructs to write data whose length is less than 16K bytes, the processing unit 110 enters the buffered write mode. Specifically, in the buffered write mode, the processing unit 110 issues a control signal CTRL to direct the data dispatcher 120 to send data DAT1 to a buffer controller 130 and issues a command CMD2 to direct the buffer controller 130 to store the data DAT1 in a designated region of a buffer. Subsequently, after data of the buffer is collected to one page length, the processing unit 110 issues a command CMD2 to direct the buffer controller 130 to output data DAT2 or DAT3 of a designated region of the buffer to the access interface 170 and then, issues a command CMD3 to direct the access interface 170 to program the data DAT2 or DAT3 into a designated address of the storage unit 180. The data dispatcher 120 may be practiced in a de-multiplexer to couple the data line of the access interface 150 to either the buffer controller 130 or the access interface 170 according to the control signal CTRL. FIG. 4 is a schematic diagram illustrating a buffer according to an embodiment of the invention. Each region may contain four sub-regions to store four units of data, respectively, and each unit has a fixed length, such as 4K bytes. It should be noted that the quantity of sub-regions contained in each region can be adjusted depending on different design requirements of storage sub-units and RAID (Redundant Array of Independent Disks), and the invention should not be limited thereto.

In the buffered write mode, the write command can be one type of priority write and non-priority write. Non-priority write may include a command for flushing the redo log of the storage unit 180. If the write command CMD1 contains information of a priority write, the processing unit 110 may issue a control signal CTRL to direct the data dispatcher 120 to store the data DAT1 from the first available sub-region of the region 400_0_0 to the last sub-region thereof (may be referred to as a first direction). For example, the data DAT1 is stored in the first sub-region, the second sub-region of the region 400_0_0, and so on. If the write command CMD1 contains information of a non-priority write, the processing unit 110 may issue a control signal CTRL to direct the data dispatcher 120 to store the data DAT1 from the last available sub-region of the region 400_0_i to the first sub-region thereof (may be referred to as a second direction). For example, the data DAT1 is stored in the fourth sub-region, the third sub-region of the region 400_0_i, and so on. Registers of the buffer controller 130 store two tail pointers: One points to the next available sub-region for storing data instructed by a priority write command; and the other points to the next available sub-region for storing data instructed by a non-priority write command. The buffer controller 130 obtains the next available sub-region for a priority or non-priority write command according to a corresponding tail pointer. After successfully storing data in the buffer 400, the buffer controller 130 updates the corresponding tail pointer to point to the available sub-region next to the last data unit of the stored data.

RAID engines 140_1 and 140_3 generate ECC (Error Check and Correction) codes according to data DAT2 and DAT3, respectively. Registers of the buffer controller 130 store two head pointers: One points to the first sub-region for storing data instructed by a priority write command, which has not been programmed into the storage unit 180; and the other points to the first sub-region for storing data instructed by a non-priority write command, which has not been programmed into the storage unit 180. The buffer controller 130 periodically determines whether data of the buffer 400 is required to be programmed into the storage unit 180 according to the four pointers of the registers and program policies. If so, the buffer controller 130 sends one page of data to one of the RAID engines 140_1 and 140_3 and issues a command CMD3 to direct the access interface 170 to receive the data DAT2 or DAT3 and corresponding ECC code from the RAID engine and program that to a designated address of the storage unit 180.

Figure 5:
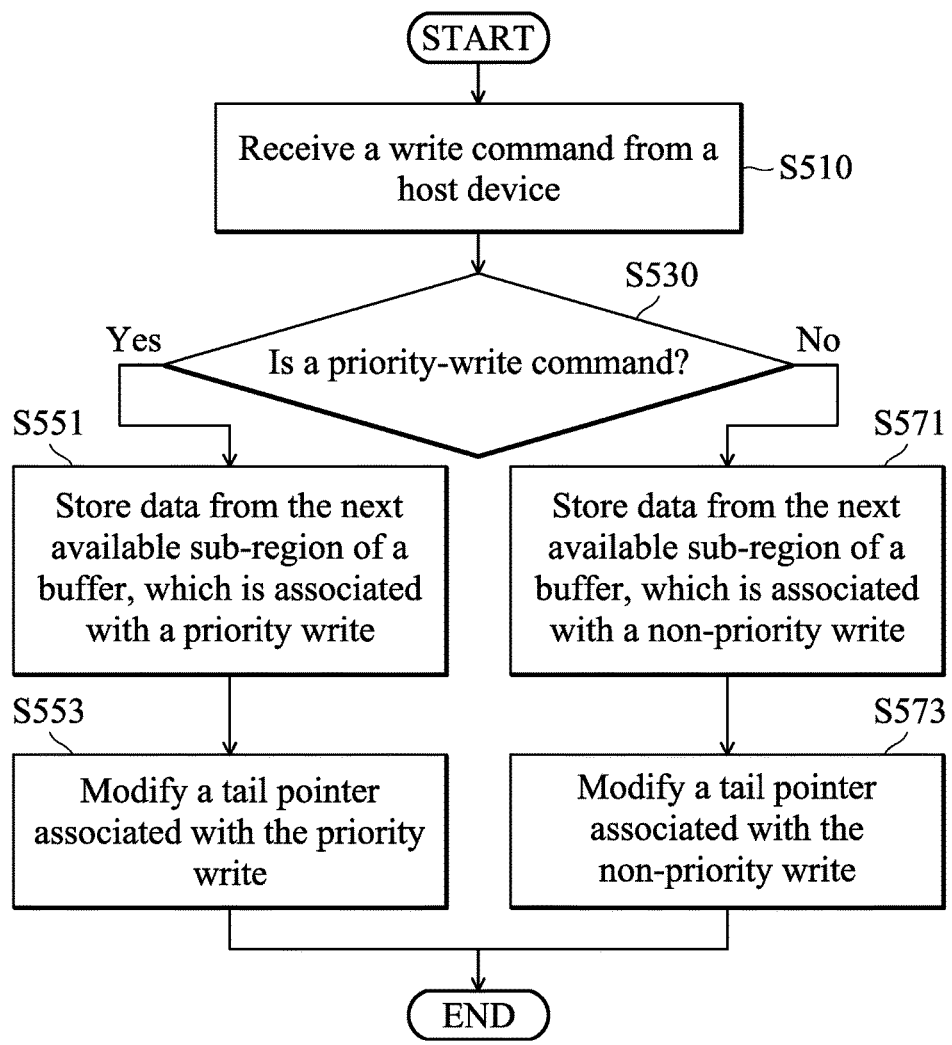
FIG. 5 is a flowchart illustrating a method for priority writes in an SSD system, performed by a processing unit when loading and executing relevant firmware or software routines, according to an embodiment of the invention.

FIG. 5 is a flowchart illustrating a method for priority writes in an SSD system according to an embodiment of the invention. In the buffered write mode, the method is performed by the processing unit 110 when loading and executing relevant firmware or software routines to move less than one page of data to a designated region of the buffer 400. First, the processing unit 110 receives a write command CMD1 from the host device 160 via the access interface 150, which includes information indicating whether it is a priority write (step S510). When determining that the write command CMD1 is a priority write (the "Yes" path of step S530), the processing unit 110 performs a priority write procedure (steps S551 to S553). Otherwise (the "No" path of step S530), the processing unit 110 performs a non-priority write procedure (step S571 to S573).

Figure 7:
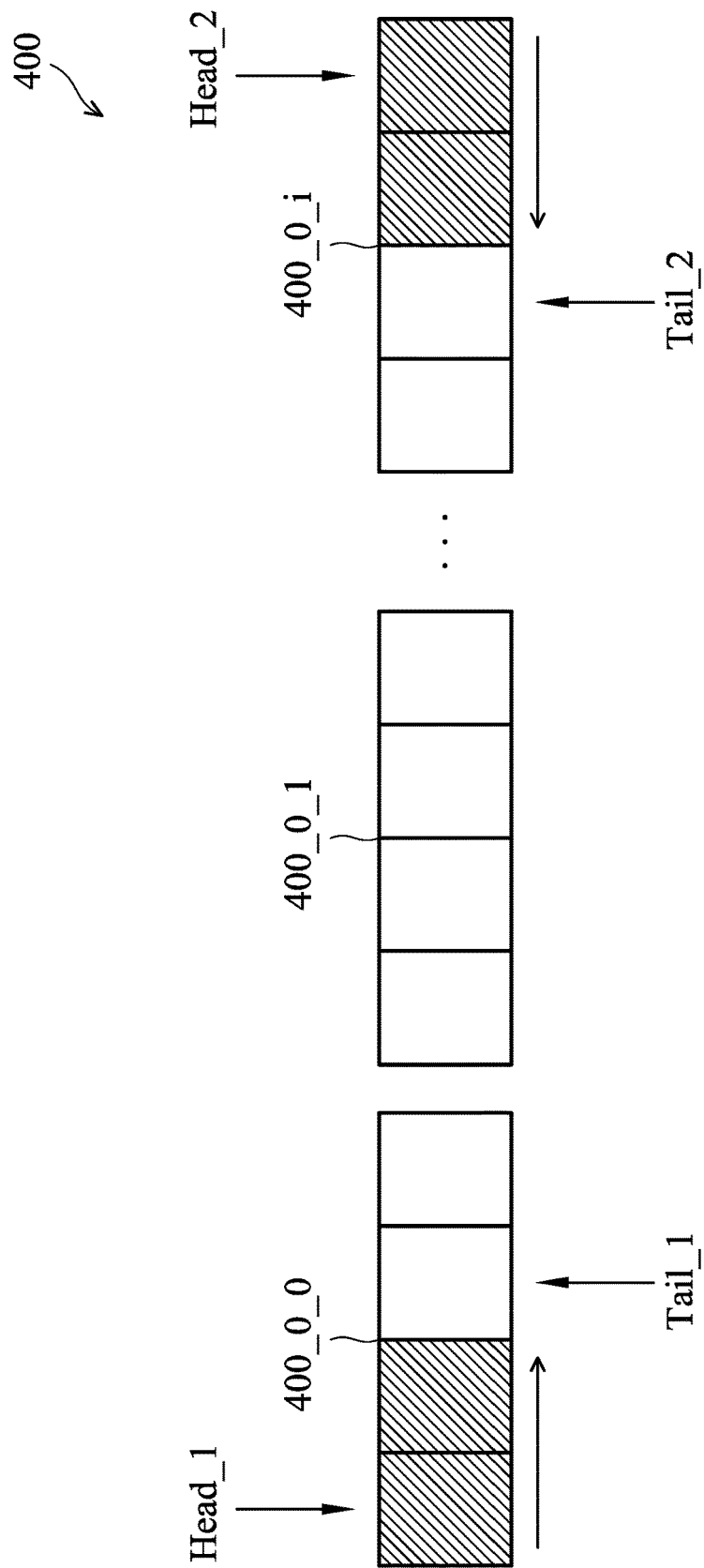
FIG. 7 is a schematic diagram of a buffer according to an embodiment of the invention.

In the priority write procedure, the processing unit 110 directs the data dispatcher 120 to send data DAT1 to the buffer controller 130 and directs the buffer controller 130 to store the data DAT1 from the next available sub-region of the buffer, which is associated with the priority write (step S551). Next, after storing the data DAT1 successfully, the buffer controller 130 modifies the tail pointer associated with the priority write to point to an address of an available sub-region next to the last sub-region storing the data DAT1 (step S553). In the non-priority write procedure, the processing unit 110 directs the data dispatcher 120 to send data DAT1 to the buffer controller 130 and directs the buffer controller 130 to store the data DAT1 from the next available sub-region of the buffer, which is associated with the non-priority write (step S571). Next, after storing the data DAT1 successfully, the buffer controller 130 modifies the tail pointer associated with the non-priority write to point to an address of an available sub-region next to the last sub-region storing the data DAT1 (step S573). FIG. 7 is a schematic diagram of a buffer according to an embodiment of the invention. Assume that the buffer controller 130 stores two units of priority-write data and two units of non-priority-write data in the buffer 400: After successfully storing two units of the priority-write data from the first sub-region of the region 400_0_0 of the buffer 400 to the last one (step S551), the buffer controller 130 modifies the tail pointer Tail_1 associated with the priority write to point to the third sub-region of the region 400_0_0 (that is, an available sub-region next to the last sub-region storing the priority-write data) (step S553). After successfully storing two units of the non-priority-write data from the last sub-region of the region 400_0_i of the buffer 400 to the first one (step S571), the buffer controller 130 modifies the tail pointer Tail_2 associated with the non-priority write to point to the third sub-region of the region 400_0_i from the end (that is, an available sub-region next to the last sub-region storing the non-priority-write data) (step S573).

Figure 6:
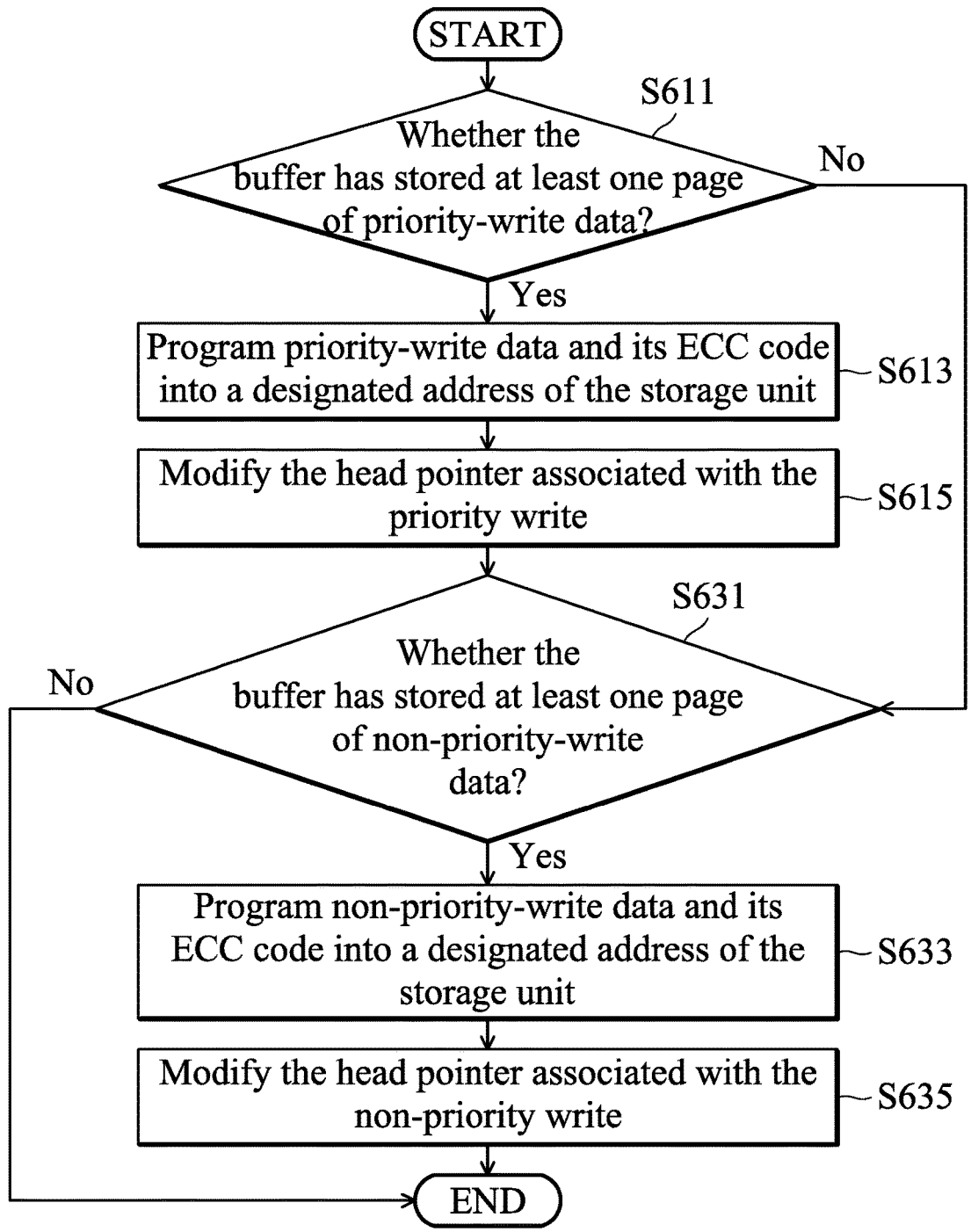
FIG. 6 is a flowchart illustrating a method for priority writes in an SSD system, performed by a buffer controller, according to an embodiment of the invention.

FIG. 6 is a flowchart illustrating a method for priority writes in an SSD system, performed by a buffer controller, according to an embodiment of the invention. The buffer controller 130 periodically practices the method to program zero or more data units of the buffer 400 into a designated address of the storage unit 180. In each iteration, the buffer controller 130 determines whether the buffer 400 has stored at least one page of priority-write data (step S611). In step S611, the determination is made by the buffer controller 130 according to the head and tail pointers associated with the priority write. If a quantity of data units between the head and tail pointers associated with the priority write exceeds a quantity of data units equaling one page, it is determined that the buffer 400 has stored at least one page of priority-write data. When determining that the buffer 400 has stored at least one page of priority-write data (the "Yes" path of step S611), the buffer controller 130 outputs one or more complete pages of priority-write data DAT2 of the buffer 400 to the RAID engine 140_1 and directs, by issuing a command CMD3, the access interface 170 to receive the priority-write data DAT2 and its ECC code ECC1 from the RAID engine 140_1 to program them into a designated address of the storage unit 180 (step S613). The access interface 170 may contain a multiplexer for coupling one of the RAID engines 140_1 and 140_3 to the storage unit 180. After successfully programming the priority-write data DAT2, the buffer controller 130 modifies the head pointer associated with the priority write to point to a sub-region next to the last sub-region, which stores the programmed data DAT2 (step S615), and determines whether the buffer 400 has stored at least one page of non-priority-write data (step S631). When determining that the priority-write data of the buffer 400 is insufficient to fill one page (the "No" path of step S611), the buffer controller 130 determines whether the buffer 400 has stored at least one page of non-priority-write data (step S631). In step S631, the determination is made by the buffer controller 130 according to the head and tail pointers associated with the non-priority write. If a quantity of data units between the head and tail pointers associated with the non-priority write exceeds one page of data units, it is determined that the buffer 400 has stored at least one page of non-priority-write data. When determining that the buffer 400 has stored at least one page of non-priority-write data (the "Yes" path of step S631), the buffer controller 130 outputs one or more complete pages of non-priority-write data DAT3 of the buffer 400 to the RAID engine 140_3 and directs, by issuing a command CMD3, the access interface 170 to receive the non-priority-write data DAT3 and its ECC code ECC2 from the RAID engine 140_3 to program them into a designated address of the storage unit 180 (step S633). After successfully programming the non-priority-write data DAT3, the buffer controller 130 modifies the head pointer associated with the non-priority write to point to a sub-region next to the last sub-region, which stores the programmed data DAT3 (step S635), and ends the whole process. When determining that the non-priority-write data of the buffer 400 is insufficient to fill one page (the "No" path of step S631), the whole process ends. It should be noted that, since the priority-write data has a higher priority than the non-priority-write data, the step S631 should be executed after the step S611.

Although the embodiment has been described as having specific elements in FIGS. 1 to 3, it should be noted that additional elements may be included to achieve better performance without departing from the spirit of the invention. While the process flows described in FIGS. 5 and 6 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for priority writes in an SSD (Solid State Disk) system, performed by a processing unit, comprising:
   receiving a priority write command instructing the processing unit to write first data whose length is less than a page length in a storage unit;
   directing a buffer controller to store the first data from the next available sub-region of a buffer, which is associated with a priority write, in a first direction;
   receiving a non-priority write command instructing to write second data whose length is less than page length in the storage unit; and
   directing the buffer controller to store the second data from the next available sub-region of the buffer, which is associated with a non-priority write, in a second direction.

2. The method of claim 1, wherein the first direction is opposite to the second direction.

3. The method of claim 1, comprising:
   after storing the first data in the buffer, modifying a first tail pointer to point to an available sub-region next to the last sub-region, which stores the first data; and
   after storing the second data in the buffer, modifying a second tail pointer to point to an available sub-region next to the last sub-region, which stores the second data.

4. The method of claim 1, comprising:
   before directing the buffer controller to store the first data in the buffer, directing the data dispatcher to couple a first access interface to the buffer controller for sending the first data to the buffer controller; and
   before directing the buffer controller to store the second data in the buffer, directing the data dispatcher to couple the first access interface to the buffer controller for sending the second data to the buffer controller.

5. The method of claim 4, wherein the data dispatcher is a de-multiplexer for coupling the first access interface to the buffer controller or a second access interface according to a control signal.

6. The method of claim 1, wherein the buffer controller periodically determines whether the buffer has stored at least one page of the first data; and, when the buffer has stored at least one page of the first data, the buffer controller programs one or more complete pages of the first data into the storage unit.

7. The method of claim 6, wherein, when the buffer has stored at least one page of the first data, the buffer controller outputs the complete page or pages of the first data to a first RAID (Redundant Array of Independent Disks) engine; and directs an access interface to receive the complete page or pages of the first data and a first ECC (Error Check and Correction) code from the first RAID engine and program the complete page or pages of the first data and the first ECC code into the storage unit.

8. The method of claim 7, wherein, after successfully programming the complete page or pages of the first data and the first ECC code into the storage unit, the buffer controller modifies a first tail pointer to point to an available sub-region next to the last sub-region, which stores the first data.

9. The method of claim 6, wherein, after successfully programming the complete page or pages of the first data and the first ECC code into the storage unit, the buffer controller determines whether the buffer has stored at least one page of the second data; and, when the buffer has stored at least one page of the second data, the buffer controller programs one or more complete pages of the second data into the storage unit.

10. The method of claim 9, wherein, when the buffer has stored at least one page of the second data, the buffer controller outputs the complete page or pages of the second data to a second RAID engine; and directs the access interface to receive the complete page or pages of the second data and a second ECC code from the second RAID engine and program the complete page or pages of the second data and the second ECC code into the storage unit.

11. An apparatus for priority writes in an SSD (Solid State Disk) system, comprising:
   a buffer controller; and
   a processing unit, coupled to the buffer controller, receiving a priority write command instructing the processing unit to write first data whose length is less than a page length in a storage unit from a host device; directing the buffer controller to store the first data from the next available sub-region of a buffer, which is associated with a priority write, in a first direction; receiving a non-priority write command instructing to write second data whose length is less than page length in the storage unit from the host device; and directing the buffer controller to store the second data from the next available sub-region of the buffer, which is associated with a non-priority write, in a second direction.

12. The apparatus of claim 11, wherein the first direction is opposite to the second direction.

13. The apparatus of claim 11, wherein buffer controller, after storing the first data in the buffer, modifies a first tail pointer to point to an available sub-region next to the last sub-region, which stores the first data; and, after storing the second data in the buffer, modifies a second tail pointer to point to an available sub-region next to the last sub-region, which stores the second data.

14. The apparatus of claim 11, wherein the processing unit, before directing the buffer controller to store the first data in the buffer, directs a data dispatcher to couple a first access interface to the buffer controller for sending the first data to the buffer controller; and, before directing the buffer controller to store the second data in the buffer, directs the data dispatcher to couple the first access interface to the buffer controller for sending the second data to the buffer controller.

15. The apparatus of claim 14, wherein the data dispatcher is a de-multiplexer for coupling the first access interface to the buffer controller or a second access interface according to a control signal.

16. The apparatus of claim 11, wherein the buffer controller periodically determines whether the buffer has stored at least one page of the first data; and, when the buffer has stored at least one page of the first data, programs one or more complete pages of the first data into the storage unit.

17. The apparatus of claim 16, wherein, when the buffer has stored at least one page of the first data, the buffer controller outputs the complete page or pages of the first data to a first RAID (Redundant Array of Independent Disks) engine; and directs an access interface to receive the complete page or pages of the first data and a first ECC (Error Check and Correction) code from the first RAID engine and program the complete page or pages of the first data and the first ECC code into the storage unit.

18. The apparatus of claim 17, wherein, after successfully programing the complete page or pages of the first data and the first ECC code into the storage unit, the buffer controller modifies a first tail pointer to point to an available sub-region next to the last sub-region, which stores the first data.

19. The apparatus of claim 16, wherein, after successfully programming the complete page or pages of the first data and the first ECC code into the storage unit, the buffer controller determines whether the buffer has stored at least one page of the second data; and, when the buffer has stored at least one page of the second data, the buffer controller programs one or more complete pages of the second data into the storage unit.

20. The apparatus of claim 19, when the buffer has stored at least one page of the second data, the buffer controller outputs the complete page or pages of the second data to a second RAID engine; and directs the access interface to receive the complete page or pages of the second data and a second ECC code from the second RAID engine and program the complete page or pages of the second data and the second ECC code into the storage unit.

\* \* \* \* \*